UNITED STATES PATENT OFFICE.

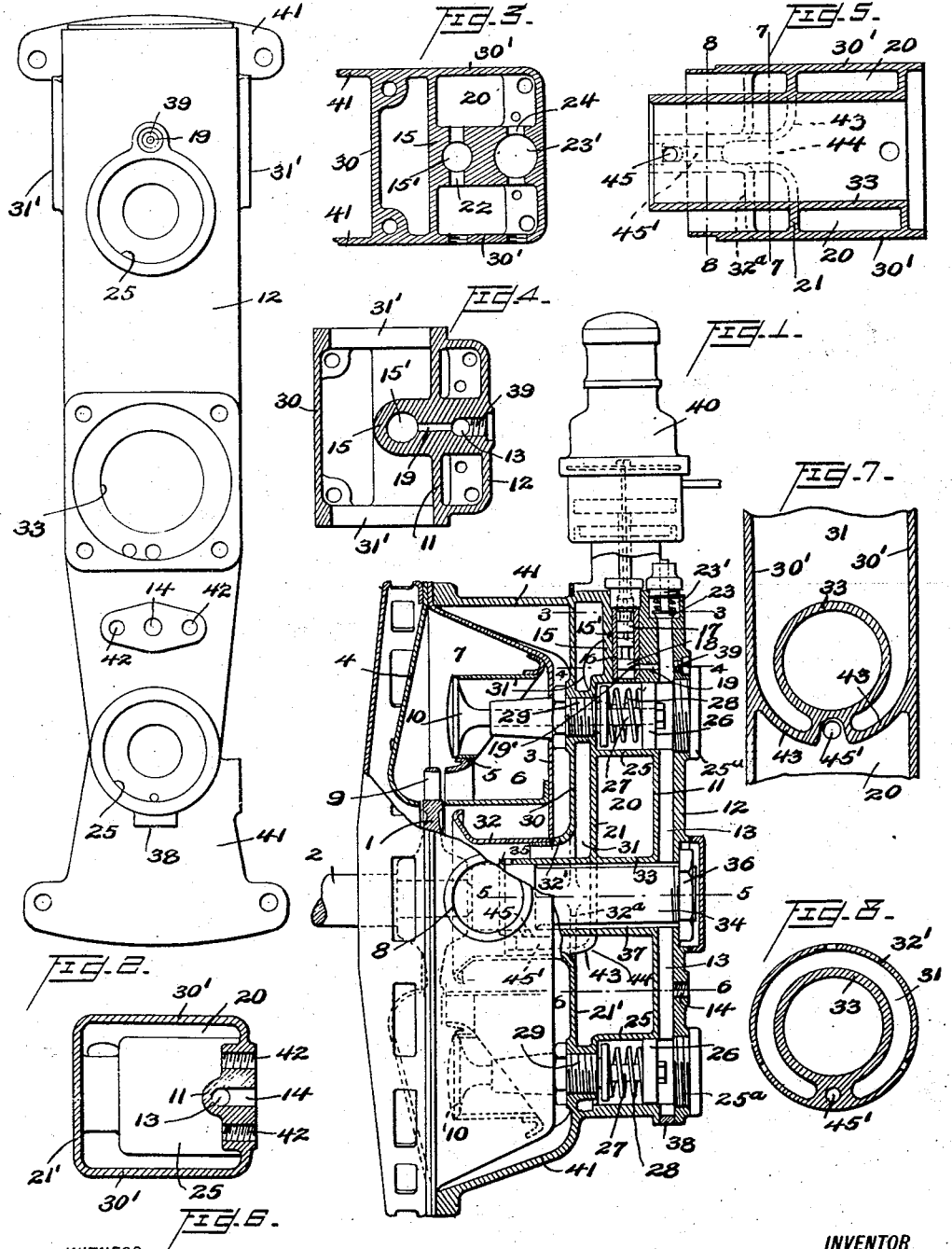
E. H. SHERBONDY.
TURBINE CONTROL HOUSING.
APPLICATION FILED MAY 14, 1918.
1,346,565.  Patented July 13, 1920.
2 SHEETS—SHEET 1.
INVENTOR
Earl H. Sherbondy

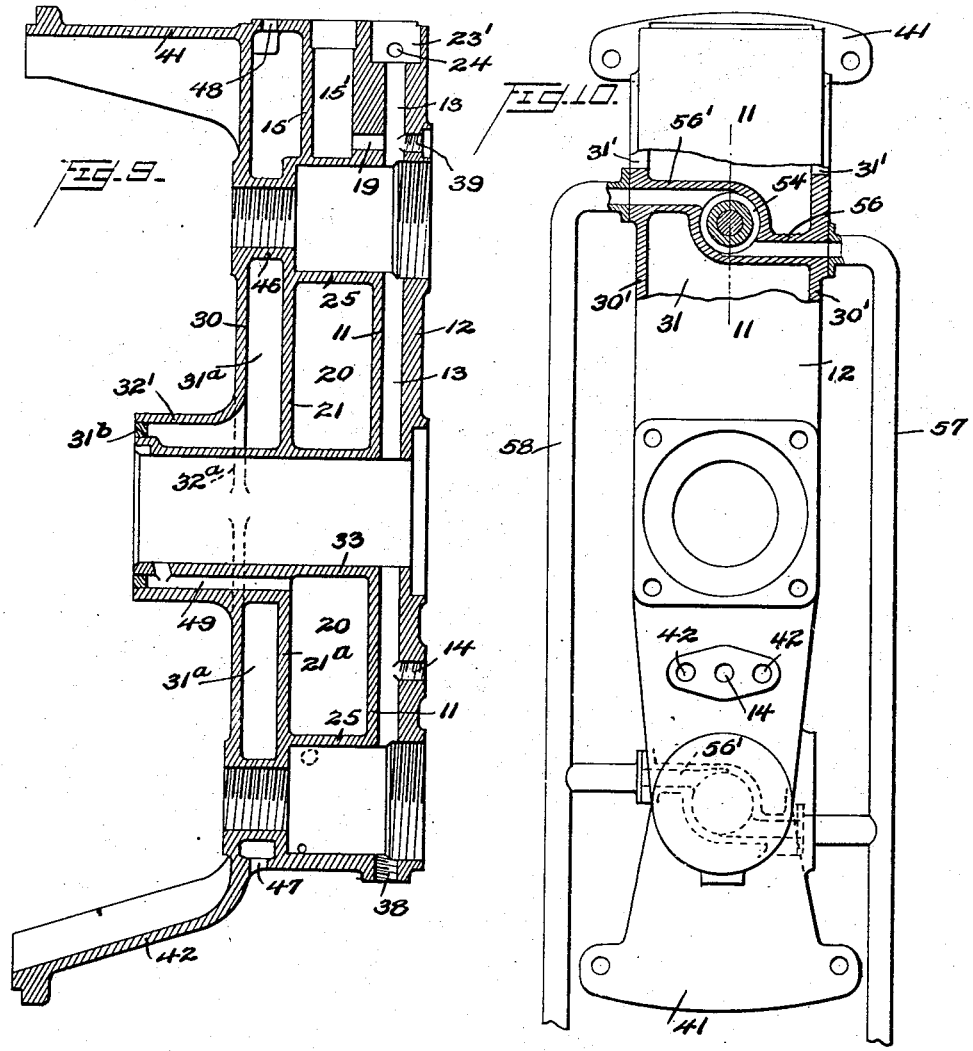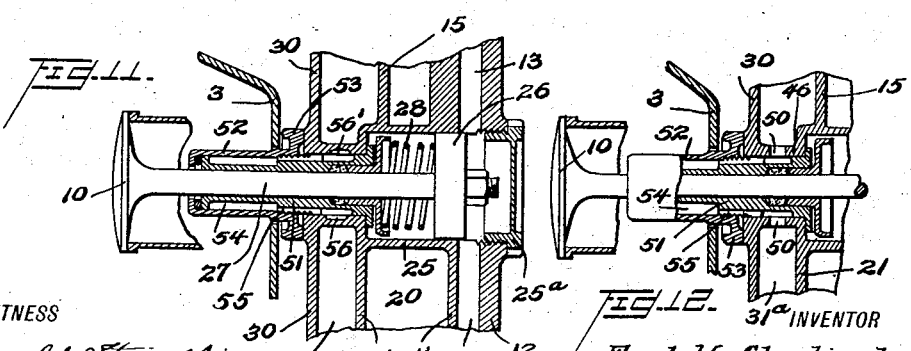

EARL H. SHERBONDY, OF CLEVELAND, OHIO.

TURBINE CONTROL-HOUSING.

1,346,565.   Specification of Letters Patent.   Patented July 13, 1920.

Application filed May 14, 1918. Serial No. 234,557.

*To all whom it may concern:*

Be it known that I, EARL H. SHERBONDY, a citizen of the United States, residing at Cleveland, in the county of Cuyahoga and State of Ohio, have invented certain new and useful Improvements in Turbine Control-Housings, of which the following is a specification.

This invention relates to the housing designed to serve as mounting means for a number of controlling devices that are used in controlling a particular turbine unit.

The turbine in question is adapted to be operated by the waste gases from an internal combustion engine, and is adapted to drive a centrifugal compressor, as more particularly described in my co-pending case, Serial No. 224894, filed March 26, 1918.

The turbine is intended to be automatically controlled by pressure responsive valves, which pressure responsive valves are interpolated in an oil pressure line, which oil pressure line in turn controls one or more by-pass valves that control the speed of the turbine.

Among the objects of the invention are, first, to provide a one-piece housing which is provided with oil pressure passages, oil waste passages, a recess for carrying an oil pressure relief valve, and a recess in which is mounted a housing for certain other pressure control valves, one or more recesses for the mounting of certain pistons controlling one or more by-pass valves, and a standard for supporting the pressure responsive means that control said pressure control valves.

This one-piece housing is also designed to provide air passages for leading cooling air to the turbine, and to provide a supporting means for supporting an air guide that serves to guide said cooling air to the turbine.

This housing is also designed to serve as supporting means for the stem or stems of the by-pass valves.

The housing, further, is designed to serve as mounting means for a bearing housing, which bearing housing in turn is designed to support the shaft of the turbine. This bearing housing is designed to be associated with the main housing in such a manner as to be in connection with the oil pressure passage in said main housing.

It is evident that this housing, designed to serve these various functions, is of great importance in making a small compact unit, which is very economical of space, and further, which lends itself to a fairly rapid production in the shop. As set forth in my said co-pending case, Serial No. 224,894 the turbine is intended to be mounted on an airplane engine, and in such a location compactness and lightness are of the greatest importance.

Other objects and advantages will appear as the description proceeds.

In the drawings representing an embodiment of my invention, Figure 1 is a side view, partly broken away, of the housing mounted in position on a turbine casing; Fig. 2 is an end view of the housing; Figs. 3, 4, 5 and 6 are sections, respectively, on line 3—3, 4—4, 5—5 and 6—6, of Fig. 1; Figs. 7 and 8 are sections on 7—7 and 8—8 of Fig. 5. Fig. 9 shows a modification in which the housing proper is water cooled; Fig. 10 shows a modification in which the housing proper is air cooled, as in Fig. 1, but in which the valve stem is water cooled; Fig. 11 is a section on the line 11—11 of Fig. 10; and Fig. 12 is a modification of parts shown in Fig. 9, showing a water cooled valve stem.

Referring now to the drawings, the turbine 1, mounted on a shaft 2 is mounted in a turbine casing consisting of the main casing element 3, backing plate 4 and diaphragm 5. The diaphragm is arranged within the casing, so as to define an inlet chamber 6, and outlet chamber 7, the latter being provided with an exhaust pipe 8. The gases pass through the buckets 9 of the turbine, into the exhaust chamber 7, and thence, out through the pipe 8. A turbine controlling element, such as the valve 10 is mounted in the diaphragm 5 in such a way, that when open the gases will be by-passed from chamber 6 to chamber 7, without going through the turbine. Movement of this valve 10 will evidently control the speed of the turbine. The subject matter of this invention is the controlling housing that is adapted to be mounted on the back of the casing 3, as shown in Fig. 1.

To take up the functions of this housing one by one, the housing carries walls 11 and 12, which define between them the oil passage 13, which is adapted to carry oil under pressure. This oil under pressure enters passage 13 through a pressure stage valve, (not shown) which is bolted on the wall 12, so that its delivery pipe delivers oil into the opening 14, which opening is in connection with the oil pressure passage 13.

In the upper part of the housing defined between the walls 11 and 15 of the housing, which walls are cast integral with the housing, there is a recess 15′, in which is located a bushing 16, in which bushing are located valves 17 and 18. Oil from the pressure passage 13 is admitted to the valves 17 and 18 through a passage 19, drilled in the wall 11, and a passage 19′ in the bushing 16. These valves 17 and 18 control the flow of oil from the pressure passage 13 to the waste passage 20, the latter being defined by walls 21, 21′ and 11. The particular construction of the wall through the valves 17 and 18 need not be described here, since it is detailed in my said co-pending Serial Number 224,894. The valve 18 is designed to bleed the oil passage 13, to allow oil to escape through the openings 22 into the oil waste passage 20.

At some convenient point in communication with the passage 13, a recess 23′ is provided, in which a relief valve 23 is positioned, which valve will unseat and relieve excess pressure in the oil pipe 13, the excess oil escaping into the waste passage 20, through the openings 24, as shown in Fig. 3.

Circular walls 25, cast integral with the rest of the housing define recesses in which valve controlling elements, such as pistons 26, mounted on the ends of the valve stems 27, move. These cylinders or recesses may be closed by suitable caps 25ª. The cylinders in which said pistons move are in direct communication with the pressure passage 13, so that variations in the oil pressure in said passage will cause movement of said pistons. Springs 28 are mounted on the other side of the pistons 1, to return the pistons to their normal position.

The valve stems 27 move in collars 29, which collars are screw threaded into the wall 21 of the housing and wall 30 of said housing. Walls 21 and 30 are connected, as shown, to provide threaded seats for these collars. It should be noted that said threaded seats are concentric with the cylinders for the pistons 26.

Defined between walls 30 and 21 there is an air space 31. The wall 30 is bent, as shown, to provide a mounting means for an annular air guide 32, the purpose of this air guide being to guide cooling air coming down passage 31 onto the side of the turbine 1, in order to cool it, the cooling being necessary because of the high temperatures met with in a turbine operated by exhaust gases from an internal combustion engine. The air enters the passage 31 through openings 31′ in the side walls 30′ of the housing. After the air leaves the turbine, it escapes through the space between wall 30 and turbine casing 3. This cooling air may be led or forced into the air passage 31 by any suitable means. The housing of this invention also has cast integral therewith an annular wall 33, which serves as a casing for a turbine bearing housing 34. The housing 34 has a flange 35, which abuts against the end of the wall 33, which is tightened into place by nut 36, which abuts against the wall 12. The wall 33 and housing 34 define between them an oil passage 37, which is in communication with the oil passage 13, the purpose of said passage 37 being to lead oil to the turbine bearing (not shown). 38 and 39 are plugs closing holes, which are necessary to be drilled in drilling out the passages 13 and 19, respectively.

Mounted on the upper part of the housing is another housing 40, in which housing are located devices for controlling the valves 17 and 18, which are described in detail in my said co-pending case Serial No. 224,894, and which need not be set forth here.

The housing has cast integral therewith upper and lower flanges 41, which serve to mount the housing on the turbine casing. The pressure stage valve which admits oil to the opening 14, is mounted by means of bolts engaging in the holes 42. Since the flanges 41 may be accurately machined to size, the housing may be accurately positioned with respect to the turbine casing by attaching the housing to the casing by means of these flanges.

The wall 21, below the wall 33, is curved as at 43 to merge into the wall 33, to leave a space 44 just below the wall 33. This passage 44 empties at one end into the oil waste passage 20, and is in communication through a hole 45′ with a hole 45, drilled through the wall 33, the purpose of these just described passages being to lead oil from the turbine bearing to the waste passage 20.

To summarize, the housing control comprises the walls 11, 12, 21, 25, 30, 33 and 15, together with the necessary end walls, which several walls define oil pressure and oil waste passages, air passages, piston recesses, valve recesses, a relief valve recess, a valve piston collar mounting, an air guide mounting, and the mounting for a housing for certain controlling devices, and a mounting for a pressure stage valve. It is evident that this single casting, which performs the described plurality of functions, makes for an extremely compact housing control.

The outwardly curved part of the wall 30, designated 32′, merges into wall 30, along the line 32ª, Figs. 1 and 5.

Referring now to the modification shown in Fig. 9, the casting is of the same general design as in Fig. 1. This difference, however, should be noted—the wall 21 is continued downwardly on the other side of the annular wall 33, as shown at 21ª. The space between the walls 21 and 11, and between 21ª and 11, define the usual oil waste passage 20. In this modification the wall 30 is curved outwardly as before, and defines a space 31ª, somewhat similar to the space 31 in Fig. 1. The space 31ª, however, in Fig. 9 is closed by a ring 31ᵇ. This space 31ª is designed for the circulation of a cooling medium such as water, which water may be tapped off from the water cooling system of the engine, preferably just after it leaves the radiator on its way to the water jackets of the engine.

Defined between the wall 33 and the extension of the wall 30 is a passage 49 for oil, it communicating at opposite ends with the interior of the wall 33, which serves as a bearing housing, and with the oil waste passage 20.

The walls 21 and 30 are joined together as at 46 to provide a passage for the mounting of the valve stem of the valve 10, and a suitable valve collar therefor. This part 46 may be suitably screw threaded.

The water may enter the passage 31ª at the bottom through an aperture 47, and after circulating through the passage 31ª, may leave through an aperture 48. The circulation of the water in this manner aids in keeping the part 46 cool, which in turn aids in keeping the valve stem and valve collar cool; it also evidently aids in keeping the wall 33 and walls 21 and 21ª cool. This body of water acts to prevent the radiation of heat to the control housing from the hot turbine casing, as well as to give a positive cooling action.

In Fig. 12 there is shown a modification of Fig. 9. The only difference here shown is that wall 46, connecting walls 30 and 21, is provided with apertures 50, which are to admit the cooling medium into direct contact with the valve collar of the valve stem, and so provide a more reliable cooling means for this valve stem, and so lessening the possibility of its sticking. The mentioned valve stem collar comprises the annular collar element 51, in which the valve stem slides, which is screw threaded into the second collar element 52. The collar element 52 is provided with a head 53, which may be used to tighten the parts in place. The collars 51 and 52 define between them a space 54 for the cooling medium, the water reaching this space through the hole 50 and grooves 55 in the collar 51. The parts described are suitably flanged and provided with the necessary packing gaskets to keep the parts water tight. These parts need not be detailed here, the point being that water from the space 31ª is led into the collar for the valve stem.

Referring now to Figs. 10 and 11, a water jacketed valve stem is shown as in Fig. 12, water being led to the space 54 of the water jacket through suitable pipes 56; and after passing through the space 54, the water leaves through the pipe 56'. The pipes 56, which may be cast integral with the housing, lead to the exterior of the housing, at which point they may be connected to a suitable water pipe 57 for leading water thereto. The pipes 56' are similarly positioned, and deliver their water to a pipe 58. In Fig. 11 the walls 30 and 21 are arranged just as in Fig. 1, to define an air space 31. In this modification, therefore, the valve stem is water cooled and the rest of the housing is air cooled.

It should, of course, be understood that where air or water are suggested as cooling mediums, that any cooling medium may be used in place of either of them, if desired.

While I have shown several embodiments of my invention, it should be understood that the invention is not limited to the exact disclosures in these embodiments, but is capable of expression in other ways, as defined within the scope of the appended claims.

I claim—

1. In a turbine control housing, means defining fluid pressure and fluid waste passages, mounting means for a turbine controlling element arranged to be actuated by variations of fluid pressure in said fluid pressure passage, means to vary the fluid pressure, a turbine controlling element mounted in said mounting means and mounting means for a turbine bearing carried by said housing, in combination with means, forming a part of said housing, to carry a cooling medium on the side of the housing that faces toward the turbine, in order to prevent radiation of heat from the turbine casing to the control housing.

2. A control housing for a turbine comprising walls defining a fluid pressure passage and a fluid waste passage, walls defining a valve housing, said last mentioned walls being provided with passages in communication with said pressure and waste passages, valve means in said valve housing, said housing further comprising walls defining communicating recesses, a valve controlling element mounted in one of said recesses and a stem of said valve controlling element mounted in the other of said recesses.

3. A control housing for a turbine comprising walls defining a fluid pressure passage and a fluid waste passage, walls defining a valve housing, said last mentioned walls being provided with passages in communication with said pressure and waste passages, valve means in said valve housing, said housing further comprising walls defining a recess for a valve controlling element, a valve controlling element mounted in said recess, and mounting means for a turbine bearing carried by said housing, said housing also serving as mounting means for an air guide, said air guide being designed to direct cooling air onto the turbine, said housing carrying walls defining an air passage leading to said air guide.

4. A control housing for a turbine comprising walls defining a fluid pressure passage and a fluid waste passage, walls defining a valve housing, said last mentioned walls being provided with passages in communication with said pressure and waste passages, valve means in said valve housing, said housing further comprising walls defining a recess for a valve controlling element, a valve controlling element mounted in said recess, and mounting means for a turbine bearing carried by said housing, said housing being provided with walls defining a recess for a turbine bearing housing, said recess being in communication with said fluid pressure passage.

5. A control housing for a turbine comprising walls defining a fluid pressure passage and a fluid waste passage, walls defining a valve housing, said last mentioned walls being provided with passages in communication with said pressure and waste passages, valve means in said valve housing, said housing further comprising walls defining a recess for a valve controlling element, a valve controlling element mounted in said recess, and mounting means for a turbine bearing carried by said housing, said housing being provided with walls defining a recess for a turbine bearing housing, said recess being in communication with said fluid pressure passage, and with said fluid waste passage.

6. A control housing for a turbine comprising walls defining a fluid pressure passage and a fluid waste passage, walls defining a valve housing, said last mentioned walls being provided with passages in communication with said pressure and waste passages, valve means in said valve housing, said housing further comprising walls defining a recess for a valve controlling element, a valve controlling element mounted in said recess, and mounting means for a turbine bearing carried by said housing, said housing carrying a recess for a fluid relief valve, said recess being in communication with said fluid pressure passage.

7. In a turbine control housing, walls defining a fluid pressure passage, walls defining a recess for a turbine controlling device, said last-mentioned walls being provided with an opening to admit fluid pressure to said recess for said turbine controlling device, and mounting means for a turbine bearing carried by said housing, in combination with walls, carried by said housing to define a passage for a cooling medium, to aid in cooling said bearing.

8. In a turbine control housing, walls defining an oil pressure passage, walls defining a recess for a turbine controlling device, said last-mentioned walls being provided with an opening to admit oil to said recess for the said turbine controlling device and means forming a part of the housing to carry a turbine bearing, said last-mentioned means being provided with an opening whereby oil from the said oil pressure is led to said turbine bearing.

In testimony whereof I affix my signature.

EARL H. SHERBONDY.